Aug. 26, 1924.
R. N. DONALDSON ET AL
TREATING PETROLEUM OILS
Filed March 21, 1923
1,506,115
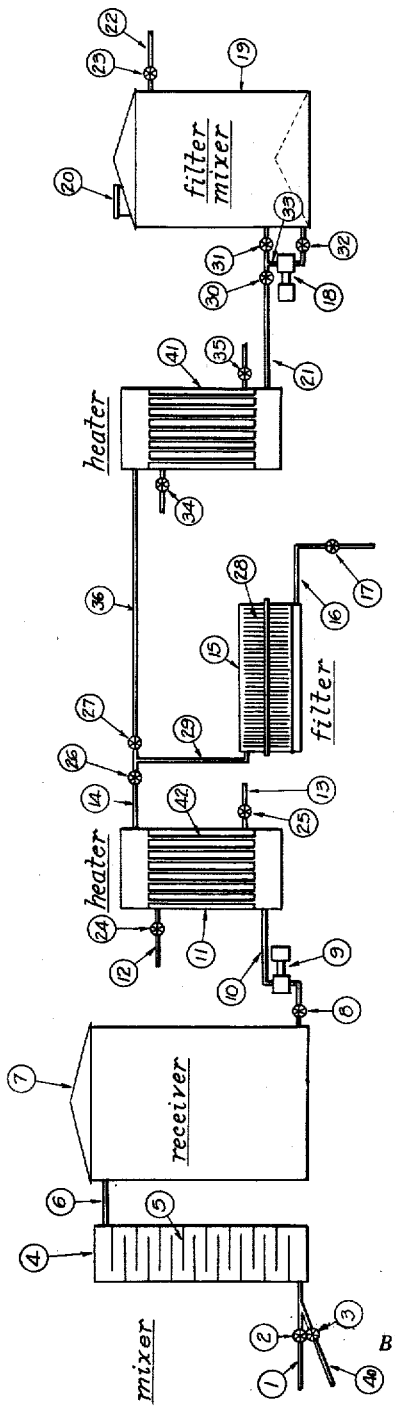
INVENTORS
Robert N. Donaldson,
Ross McCollum,
BY Booth & Booth
ATTORNEYS Patented Aug. 26, 1924.

1,506,115

UNITED STATES PATENT OFFICE.

ROBERT N. DONALDSON AND ROSS McCOLLUM, OF BAKERSFIELD, CALIFORNIA, ASSIGNORS TO STANDARD OIL COMPANY, OF SAN FRANCISCO, CALIFORNIA, A CORPORATION OF CALIFORNIA.

TREATING PETROLEUM OILS.

Application filed March 21, 1923. Serial No. 626,685.

*To all whom it may concern:*

Be it known that we, ROBERT N. DONALDSON and ROSS McCOLLUM, citizens of the United States, residing at Bakersfield, in the county of Kern and State of California, have invented certain new and useful Improvements in Treating Petroleum Oils, of which the following is a specification.

Our invention relates to the treatment of petroleum oils, by which they are better prepared for refining and in the case of oil emulsions are adapted for a successful and economical separation of their water content.

Much of the crude oil as it comes from the wells is emulsified with varying percentages of water, which will not separate on standing due to the presence of certain small percentages of emulsifying agents, which we have found to be colloidal asphalt, or a mixture of colloidal asphalt and a petroleum soap.

Very few of the well known processes have been economically successful in separating all of the water from a crude petroleum oil which contains emulsifying agents, such as petroleum soaps and asphaltic matter in a deflocculated state.

By well known processes it has been proposed to separate the water content from petroleum oils by causing the emulsified oil and water to pass through a capillary medium of minute solids capable of absorbing water, such as sawdust, rice hulls, diatomaceous earth and the like. Such processes are only successful in separating oil from water emulsions in which there are substantially no emulsifying agents present, such as deflocculated asphalt and petroleum soaps. In case the petroleum oil and water emulsion contains deflocculated asphalt or deflocculated asphalt and petroleum soaps, and an attempt is made to separate the water contents by filtering the same through a capillary medium such as sawdust, rice hulls, diatomaceous earth or the like, such a capillary medium becomes clogged, and if more pressure is applied the filter cloth may become ruptured, or the filter medium may crack or form crevices through which the oil and water will pass together with the emulsifying agents. In case a material is used which will withstand high pressure, and the emulsified oil and water is forced through a capillary medium, the deflocculated asphalt will pass through along with the oil and water in an emulsified condition, and substantially no separation of water will be effected.

We have discovered that these difficulties can be overcome by flocculating the colloidal asphaltic matter present in a petroleum oil, before the filtering operation, by the addition of sulphuric acid, preferably under heat, which not only flocculates the colloidal asphaltic matter, but also decomposes any petroleum soaps that may be present, but without the formation of sulfonated hydrocarbons. In practice we prefer to use sulphuric acid, dissolved in water to a strength which while sufficient to decompose petroleum soaps and flocculate the colloidal asphaltic matter, is of sufficient dilution to prevent the formation of sulfonated hydrocarbons during the treatment, heat being usually applied to facilitate the action and hasten the filtering operation.

The decomposition of petroleum soaps may be expressed by the following equation:

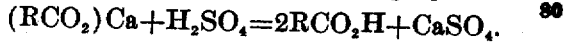

$$(RCO_2)Ca + H_2SO_4 = 2RCO_2H + CaSO_4.$$

The equation given shows only one type of a petroleum soap that may be present in a petroleum oil; other types may be present, and may be combined with other metals, such as magnesium, sodium, iron or the like, but the decomposition will take place as shown, regardless of the type, or the type to which the metal is combined.

In the filtering operation the flocculated asphalt collects on the filter medium and is removed together with the filter medium at regular intervals, replacing said filter medium with a clean or new material. In practice we prefer to use a filter medium of specially selected diatomaceous earth free from clay, dirt or other impurities, which has been calcinated to free the same from its water content. Such a filter medium may be purified after use by calcining, and used over again.

We prefer a filter medium of diatomaceous earth deposited on a canvas filter cloth ranging from $\frac{1}{16}''$ to $\frac{1}{4}''$ in thickness, which must be free from moisture and uniformly deposited on the canvas filter cloth.

This invention is also of commercial value for the removal of deflocculated asphalt from crude petroleum oils which are free from water emulsions.

In distilling operations of crude petroleum oil the colloidal asphalt contained therein, upon continued heating to high temperatures necessary to vaporize the various fractions, well known in the art, is slowly flocculated and deposited on the bottom of the metal still, which forms an insulating coating interfering with the heat transfer, and if not removed may cause an overheating and destruction of the metal.

By the removal of the deflocculated asphalt from a crude petroleum oil before the distilling operation, substantially all danger of destructively overheating certain portions of metal is prevented.

An object of the invention is to separate deflocculated asphalt from petroleum oils.

Another object of the invention is to produce a petroleum oil free from deflocculated asphalt, petroleum soaps and water.

With the foregoing preliminary explanation, the preferred form of our invention will now be more fully explained by reference to the accompanying drawing, which is a diagrammatic representation of an apparatus in which the invention may be carried out.

1 is a pipe which leads from a source of emulsified petroleum oil and water, not shown, the flow of which is regulated by means of valve 2.

40 is a pipe which leads from a source of dilute sulphuric acid, not shown, the flow of which is regulated by means of valve 3.

Regulated quantities of emulsified petroleum oil and water, and the dilute sulphuric acid, under pump pressure are commingled by passing through a mixer 4, which is filled with baffles 5. The proportion of sulphuric acid will vary according to the character of the oil. Generally speaking only a relatively small quantity of the acid should be added, that is only enough to neutralize the basic constituents of the oil, and perhaps a little excess. As a mere example, to which, however, we must not be confined, we may use 5/100 of 1% to as high as 75/100 of 1% by weight of the emulsion of concentrated sulphuric acid dissolved in a sufficient quantity of water to make a water-sulphuric acid solution of a concentration ranging from 1 to 10% by weight of 66° Baumé sulphuric acid. The emulsified petroleum oil and water commingled with the dilute sulphuric acid pass from mixer 4 through a pipe 6 and into a receiving tank 7. From receiving tank 7 the emulsified petroleum oil and water commingled with the dilute sulphuric acid pass into the suction side of a pump 9 regulated by valve 8. Pump 9 discharges the emulsified petroleum oil and water commingled with the said dilute acid into a pipe 10, which leads to a heater 11. In heater 11 the emulsified petroleum oil and water commingled with the acid is heated to a sufficient temperature to flocculate substantially all of the colloidal asphalt contained therein, and also to decompose any petroleum soaps that may be present, these reactions taking place without the formation of any or substantially any sulfonated hydrocarbons. We prefer temperatures ranging from 100° F. to 200° F. depending upon the oil to be treated. For petroleum oils containing a very small percentage of emulsifying agents, a temperature of 100° F. may be sufficient, while with other emulsified petroleum oils and water, containing a higher percentage of emulsifying agents a temperature of 200° F. may be required.

12 is a pipe leading from a source of steam, not shown, controlled by a valve 24. 13 is the steam outlet from heater 11, controlled by valve 25. By regulating valves 24 and 25 the emulsified petroleum oil and water commingled with the dilute sulphuric acid passing through the tubes 42 may be heated to the required temperature necessary to flocculate the colloidal asphalt and decompose the petroleum soaps contained therein.

The petroleum oil and water containing the colloidal asphalt in a flocculated state and the decomposed petroleum soaps or organic acids pass from heater 11 into pipe 14, through valve 26 and into pipe 29 which leads to filter press 15. The filter plates 28, of filter press 15, are best fitted with canvas filter cloths, not shown on to which a filter medium of diatomaceous earth has been deposited. The petroleum oil and water emulsion containing the colloidal asphalt in a flocculated state and the decomposed petroleum soaps but free from sulfonated hydrocarbons or substantially so, which would tend to clog the filter, together with the neutralized or partially neutralized acid pass from pipe 29 under pressure through filter press 15 where the flocculated asphalt is separated and deposited on the filter medium.

From filter press 15 the products of this filtration, free from flocculated asphalt, pass into pipe 16, controlled by valve 17, and then to a storage tank, not shown, where, upon standing for a few hours, substantially all of the water content, together with the neutralized or partially neutralized dilute sulphuric acid, separate from the petroleum oil, forming a bottom layer and is drawn off.

A practicable means for depositing the required amount of diatomaceous earth on the canvas filter cloths in filter press 15 is as follows:—A sufficient amount of petroleum oil free from water and colloidal asphalt is introduced into a tank 19 through a pipe 22, controlled by valve 23, and coming from a source, not shown. The required quantity of diatomaceous earth is introduced into the petroleum oil contained in tank 19 through manhole 20. The diatomaceous earth is commingled with the petroleum oil in tank 19 by means of a circulating agitation by pump 18, which takes the mixture from the bottom of tank 19, passing it through control valve 32 and discharging it into pipe 33, which leads back into tank 19 through control valve 31, valve 30 being closed.

As soon as the petroleum oil is commingled with the diatomaceous earth, valve 30 is opened and valve 31 is closed or partially closed to maintain the agitation in tank 19. The commingled oil and diatomaceous earth are thus led through pipe 21 and to heater 41, where the mixture is heated to a temperature ranging from 100 to 200° F. by means of a steam jacket controlled by steam inlet 34 and outlet 35. The heated petroleum oil commingled with the diatomaceous earth passes into a pipe 36, valve 26 being closed and valve 27 open. From pipe 36 the oil and diatomaceous earth pass into filter press 15, where the diatomaceous earth is separated from the oil, and deposited uniformly on the canvas filter cloth, the oil passing out to a storage not shown through a pipe 16, controlled by valve 17.

We claim:—

1. The process of removing colloidal asphalt from crude petroleum oil, which comprises preliminarily treating the oil with dilute sulphuric acid to flocculate its colloidal asphaltic content without forming sulfonated hydrocarbons, and then separating the treated oil from the flocculated bodies.

2. The process of de-emulsifying crude petroleum oil emulsions containing colloidal asphalt, petroleum soaps, or the like, which comprises preliminarily treating the oil with dilute sulphuric acid to flocculate its colloidal asphalt or destroy its petroleum soap content, passing the oil so treated through a diatomaceous earth filtering medium, and then separating the filtrate.

In testimony whereof we have signed our names to this specification.

ROBERT N. DONALDSON.
ROSS McCOLLUM.